(12) United States Patent
Recknagel et al.

(10) Patent No.: US 8,483,849 B2
(45) Date of Patent: Jul. 9, 2013

(54) METHOD FOR DIGITAL DATA TRANSMISSION FROM A SENSOR TO A CONTROL UNIT

(75) Inventors: Rolf-Juergen Recknagel, Jena (DE); Matthias Wellhoefer, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1206 days.

(21) Appl. No.: 10/566,128

(22) PCT Filed: Jul. 8, 2004

(86) PCT No.: PCT/DE2004/001482
§ 371 (c)(1),
(2), (4) Date: Jul. 19, 2006

(87) PCT Pub. No.: WO2005/012046
PCT Pub. Date: Feb. 10, 2005

(65) Prior Publication Data
US 2007/0273491 A1    Nov. 29, 2007

(30) Foreign Application Priority Data
Jul. 25, 2003   (DE) .................................. 103 33 989

(51) Int. Cl.
*G05B 11/01*   (2006.01)
(52) U.S. Cl.
USPC ........................... 700/27; 701/45; 340/870.18

(58) Field of Classification Search
USPC ........................... 701/45; 700/27; 340/870.18
See application file for complete search history.

(56) References Cited

U.S. PATENT DOCUMENTS

| | | | |
|---|---|---|---|
| 6,836,714 B1 * | 12/2004 | Nitschke et al. | 701/45 |
| 6,943,669 B2 * | 9/2005 | Otterbach et al. | 340/12.33 |
| 6,944,526 B2 * | 9/2005 | Weichenberger | 701/45 |
| 2002/0016176 A1 * | 2/2002 | Glaser | 455/500 |
| 2003/0076222 A1 * | 4/2003 | Fischer et al. | 340/442 |
| 2005/0068195 A1 * | 3/2005 | Ohl et al. | 340/870.18 |

FOREIGN PATENT DOCUMENTS

| | | |
|---|---|---|
| DE | 101 29 945 | 6/2002 |
| DE | 101 21 879 | 11/2002 |
| DE | 102 29 945 | 2/2003 |
| DE | 101 49 332 | 4/2003 |

* cited by examiner

*Primary Examiner* — Mohammad Ali
*Assistant Examiner* — Sheela S Rao
(74) *Attorney, Agent, or Firm* — Kenyon & Kenyon LLP

(57) ABSTRACT

A method for digital data transmission from a sensor to a control unit is described, the sensor values of the sensor being divided for data transmission at different resolutions. The sensor values form a first range of values including successive sensor values. The first range of values for data transmission is divided as a function of a variable relevant for the control unit.

14 Claims, 2 Drawing Sheets

METHOD FOR DIGITAL DATA TRANSMISSION FROM A SENSOR TO A CONTROL UNIT

FIELD OF THE INVENTION

The present invention is directed to a method for digital data transmission from a sensor to a control unit.

BACKGROUND INFORMATION

A method for digital data transmission from a sensor to a control unit is known from German Published Patent Application No. 102 29 945. A pressure sensor signal is divided into a direct component and a differential pressure component, the direct component being transmitted from the sensor to the control unit at a lower resolution than the differential pressure component.

SUMMARY OF THE INVENTION

The method according to the present invention for digital data transmission from a sensor to a control unit has the advantage over the related art that a linear range of values including successive sensor values is formed and an additional range of values which is transmitted from the sensor to the control unit at a higher resolution is cut out of it as a function of a variable relevant for the control unit. This means that the two divided ranges of values are sub-ranges of the total range of values. The two ranges of values are successive in particular. This makes it possible, as a function of the variable relevant for the control unit, to select the range of values which the control unit preferably needs for its analysis. This saves bandwidth, since only the important values are transmitted at a high resolution, and a high resolution is still allowed for these important values.

It is particularly advantageous that the variable, as the function of which the range of values transmitted from the sensor to the control unit at a high resolution is selected, indicates the range of values within which the threshold values of an algorithm for a restraining means lie. This range of values is already predefined, this range of values being determined via simulations. Values which lie below or above may be transmitted at a lower resolution since an unambiguous decision must be reached with respect to triggering. The values, which lie very close to the general threshold values, are important for reaching an accurate triggering decision. If bidirectional transmission is provided from the control unit and the sensor, it may be the case that the control unit transmits such variables to the sensor. However, unidirectional transmission from the sensor to the control unit is generally provided, the sensor, which may be an external pressure sensor, an acceleration sensor, a weight sensor, or a pre-crash sensor, being able to be additionally supplied with power from the control unit via the line, and the sensor impressing its data on this power supply via a current modulation, for example.

The range of values which is transmitted at a higher resolution is advantageously situated in the lower half of the total range of values of the sensor values. Very high sensor values result in an unambiguous decision in a triggering algorithm of a control unit, while lower values require a more specific check to be able to execute a proper and accurate decision for triggering restraining means, such as airbags or seat-belt tensioners.

The method according to the present invention may advantageously also be used for a vehicle dynamics control system, roll-over detection and ESP (electronic stability program), for example.

DETAILED DESCRIPTION

Figure 1:
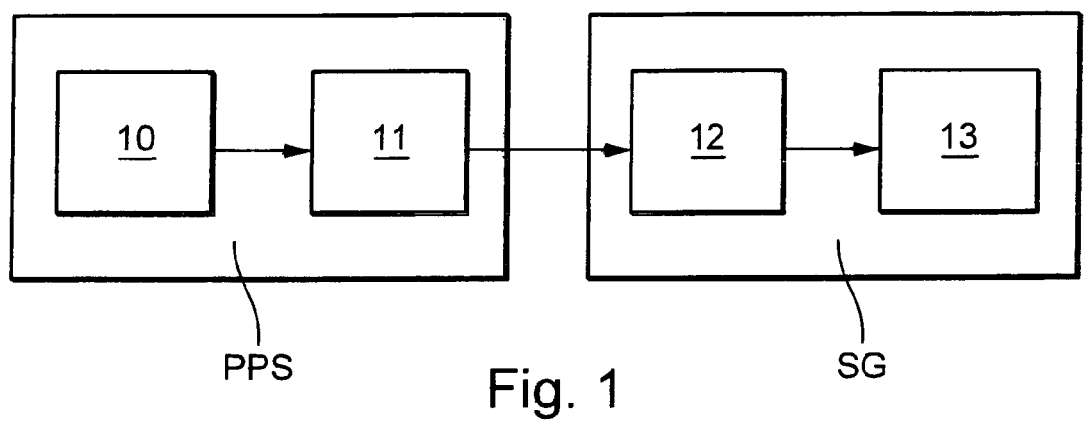
FIG. 1 shows a data transmission between the sensor and the control unit.

Crash sensors have a linear or other type of characteristic curve with which crash signals are detected. External crash sensors transmit this data in coding to an airbag control unit. The measuring range is linearly mapped on the individual digital transmission values.

The fact that the measuring range is linearly distributed on the individual admissible transmission values results in a fixed, constant resolution across the entire measuring range. However, this is disadvantageous since certain ranges of values having a higher resolution than others should be available for analysis. In a pressure sensor, the range, for example, in which the separation between triggering and non-triggering takes place, is of greater interest than the pressure characteristics which clearly lie above the triggering threshold anyway.

Such triggering thresholds may be fixed or may be adaptively changed, i.e., they are adaptively changed as a function of the crash-characterizing values. The change is then maintained for a certain amount of time in order to be changed again as applicable as a function of the crash characteristics. It is frequently not possible to transmit the entire range of values at a higher resolution for economic reasons.

The range of values of a sensor is divided into different ranges in which the values are linearly redistributed on the existing triggering values. However in the case of a pressure sensor, for example, the measuring range is divided into two even halves, for example. The first half having the lower pressure signals is distributed on ¾ of the possible transmission values, while the second half having the higher pressure signals is linearly distributed on the remaining ¼ of the possible transmission values. This results in the lower pressure values having a higher resolution, while the high pressure values are transmitted at a lower resolution.

The values in the range are distributed in a different and adapted manner in certain intervals depending on the sensor and the accuracy requirement. This distribution may be implemented via the interface, i.e., the transmitter module of the sensor. In the case of pressure values, for example, the bit width of the data transmission may be reduced at least from 16 bits to 8 bits, which makes substantial cost savings and data reduction possible.

Additional application examples for this method are, for example, up-front sensors, peripheral acceleration sensors, and acceleration sensors in the control unit. Due to the higher resolution of the signals of the up-front sensor at lower accelerations, they may also be used for pedestrian protection, for plausibility with other sensors, contact sensors, for example. A truck underride may also be better detected in this manner.

In the case of peripheral acceleration sensors and the sensors in the control unit, the plausibility and the crash onset may be determined more accurately due to a better resolution in small signals. The sensors may then also be used for determining vehicle-dynamic variables, i.e., for roll-over sensing and ESP. Determining the mounting direction for checking the installation direction is thereby also made easier. The method according to the present invention is also advantageous here, since the pre-crash sensor generates a great data flow.

FIG. 1 shows a block diagram of the transmission from a sensor to a control unit. A pressure sensor PPS is shown here as the sensor having a sensor element 10 including downstream electronics and a transmitter module 11 for transmitting the sensor values. The sensor values are transmitted to transmitter module 11 by the sensor element. Transmitter module 11 executes the division of the sensor values according to the present invention as a function of a variable relevant for the control unit. As an example, the range of values, in which the threshold values for analyzing the pressure signal lie, is transmitted at a higher resolution. Rougher divisions are also possible, e.g., only the lower half of the pressure sensor values is transmitted at a higher resolution. The transmitted sensor values are subsequently received by a receiver module 12 in control unit SG. The resolution of the sensor values is reversed here, i.e., the resolved sensor values are mapped again on the original sensor values which are subsequently analyzed in a processor 13 of control unit SG. The analysis takes place in a triggering algorithm in order to activate connected restraining means (not shown) in the event of deployment.

Instead of a pressure sensor PPS, it is alternatively possible to use the method according to the present invention in peripheral acceleration sensors in the side section or in the front-end section of the vehicle or also sensors in the control unit itself. Instead of a control unit for restraining means as shown here, control units for a vehicle dynamics control system are also possible. A kinematic sensor platform may also use the method according to the present invention for transmitting its sensor values.

Figure 2:
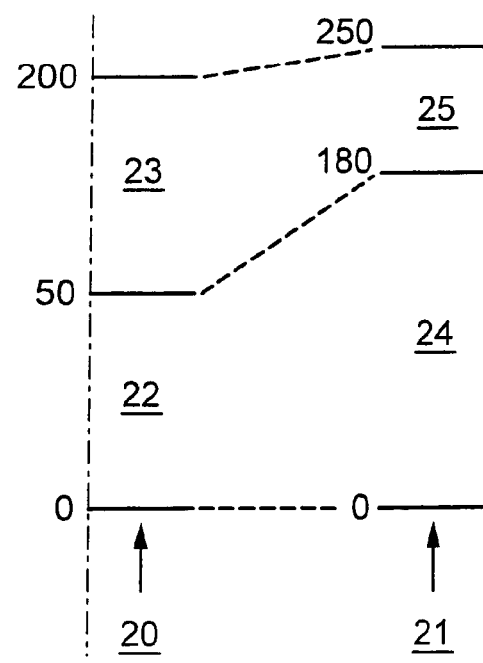
FIG. 2 shows a division of the range of values.

FIG. 2 explains in an illustration the distribution of the sensor values on the transmission values. Sensor values from 0 to 200 may be generated in sensor element 10, as illustrated in first section 20. However, the threshold values in control unit SG lie in range 22 which ranges from 0 to 50, i.e., the other range 23 from 50 to 200 is not so interesting since this range results in an unambiguous resolution because these values are well above the threshold values. Therefore, range 22 is transmitted at a higher resolution. This takes place via mapping on possible transmission values 21. Transmission values 21 are 8 bits here, from 0 to 255. In first range 24 of the transmission values, which ranges from 0 to 180, the values from range 22 are linearly mapped and are thus transmitted at a higher resolution. Range 23 is mapped on range of values 24 and is thus transmitted to control unit SG at a lower resolution. The corresponding resolution may be signaled in the data message from sensor PPS to control unit SG.

Figure 3:
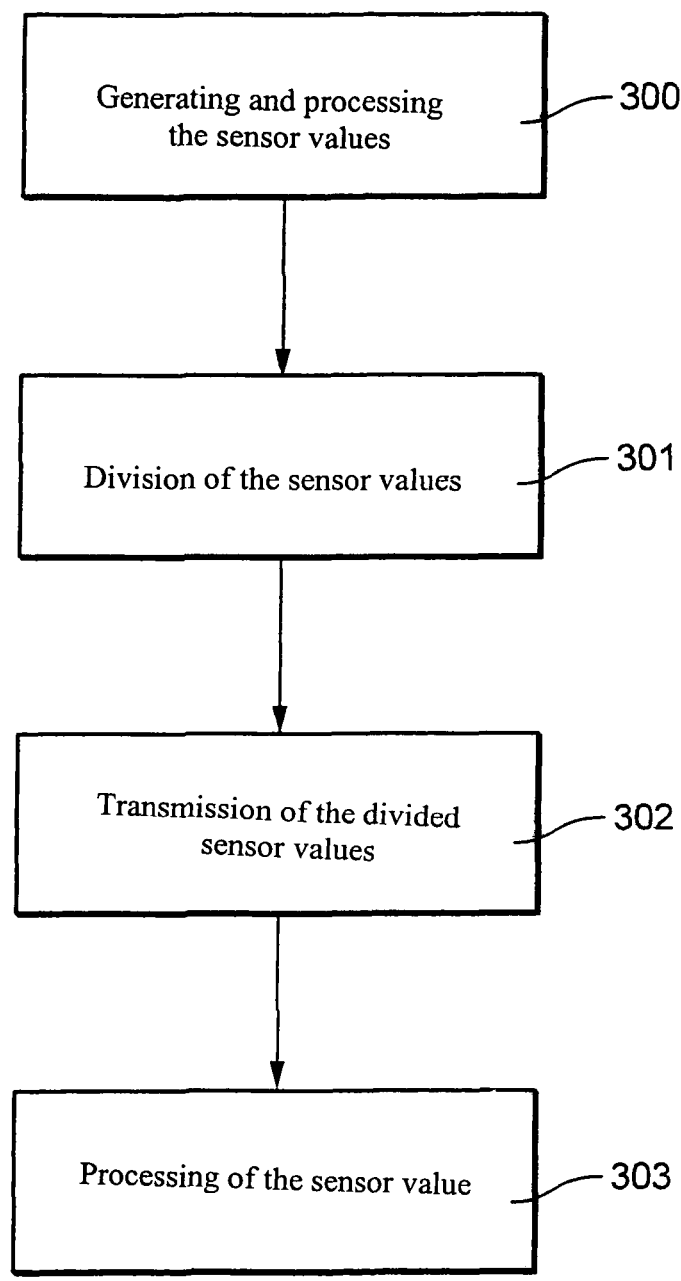
FIG. 3 shows a flow chart of the method according to the present invention.

FIG. 3 uses a flow chart to explain the procedure of the method according to the present invention. The sensor values are generated by sensor element 10 in method step 300 and are amplified, digitized, and filtered in the associated electronics. The sensor values, digitized in this way, are subsequently supplied to transmitter module 11 which divides the sensor values according to the present invention in method step 301. Transmitter module 301 executes the division of the sensor values as a function of the variable relevant for the control unit, the possible threshold values for the triggering algorithm in this case. Transmitter module 11 selects the range of values, in which the threshold values may appear, for transmission at a higher resolution, while it transmits the outlying range of values at a lower resolution. The sensor values, divided in this way, are transmitted in method step 302. In method step 303, the sensor values are received by control unit SG via receiver module 12 and supplied to processor 13 for processing in the triggering algorithm.

According to FIG. 2, a sensor value 48 which lies in range 22 is generated as an example. Therefore, this measured value 48 is transmitted from range 24 at a higher resolution. Transmission values 168 to 171 are then used for this measured value 48 as an example.

What is claimed is:

1. A method for providing digital data transmission of sensor values from a sensor to a control unit, the sensor values generated from characteristics measured by the sensor, the method comprising:
   dividing the sensor values into at least two ranges of sensor values for data transmission, each range of values being transmitted at different resolutions, the at least two ranges of sensor values including a first range of values including successive sensor values;
   wherein the sensor values are divided as a function of a variable relevant for the control unit;
   wherein a transmitter module executes the division of the sensor values as a function of the variable relevant for the control unit, wherein the variable includes the threshold values for a triggering algorithm,
   wherein the transmitter module selects the second range of values, in which the threshold values may appear, for transmission at a higher resolution, while it transmits the first range of values at a lower resolution, and
   wherein the transmitted sensor values are received by the control unit via a receiver module and are supplied to a processor for processing by the triggering algorithm.

2. The method as recited in claim 1, wherein the variable includes threshold values of a triggering algorithm for a restraining device, wherein the at least two ranges of sensor values includes a second range of sensor values, the second range of sensor values including the threshold values of the triggering algorithm for the restraining device, and wherein the sensor values in the second range of values are transmitted from the sensor to the control unit at a higher resolution.

3. The method as recited in claim 2, wherein the second range of values is selected from a lower half of the sensor values.

4. The method as recited in claim 1, wherein the method is executed by a transmitter module in the sensor.

5. The method as recited in claim 1, wherein the method is executed by a receiver module in a control unit.

6. The method as recited in claim 1, wherein the variable includes threshold values of a triggering algorithm for a restraining device, wherein the at least two ranges of sensor values includes a second range of sensor values, the second range of sensor values including the threshold values of the triggering algorithm for the restraining device, wherein the sensor values in the second range of values are transmitted from the sensor to the control unit at a higher resolution, wherein the second range of values is selected from a lower half of the sensor values, and wherein the operations are executed by a transmitter module in the sensor.

7. The method as recited in claim 1, wherein the variable includes threshold values of a triggering algorithm for a restraining device, wherein the at least two ranges of sensor values includes a second range of sensor values, the second range of sensor values including the threshold values of the triggering algorithm for the restraining device, wherein the sensor values in the second range of values are transmitted from the sensor to the control unit at a higher resolution, wherein the second range of values is selected from a lower half of the sensor values, and wherein the operations are executed by a receiver module in a control unit.

8. The method as recited in claim 2, wherein the first range of values and the second range of values are successive.

9. The method as recited in claim 2, wherein the second range of values is in a lower half of a total range of the sensor values.

10. The method as recited in claim 2, wherein the second range of values is lower than the first range of values, the second range of values being distributed on a majority of possible transmission values, and the first range of values being linearly distributed on a remainder of the possible transmission values, so that the second range of values is transmitted at a higher bit resolution and the first range of values it transmitted at a lower bit resolution.

11. A method for providing digital data transmission of sensor values from a sensor to a control unit, the sensor values being generated from characteristics measured by the sensor, the method comprising:

dividing the sensor values into at least two ranges of sensor values for data transmission, each range of values being transmitted at different resolutions, the at least two ranges of sensor values including a first range of values including successive sensor values;

wherein the sensor values are divided as a function of a variable relevant for the control unit, wherein the variable includes threshold values of a triggering algorithm for a restraining device; wherein the at least two ranges of sensor values includes a second range of sensor values, the second range of sensor values including the threshold values of the triggering algorithm for the restraining device;

wherein the first range of values and the second range of values are successive, wherein the second range of values is lower than the first range of values, the second range of values being distributed on a majority of possible transmission values, and wherein the first range of values being linearly distributed on a remainder of the possible transmission values, so that the second range of values is transmitted at a higher bit resolution and the first range of values it transmitted at a lower bit resolution;

wherein a transmitter module executes the division of the sensor values as a function of the variable relevant for the control unit, wherein the variable includes the threshold values for a triggering algorithm, wherein the transmitter module selects the second range of values, in which the threshold values may appear, for transmission at a higher resolution, while it transmits the first range of values at a lower resolution, and wherein the transmitted sensor values are received by the control unit via a receiver module and are supplied to a processor for processing by the triggering algorithm.

12. The method as recited in claim 11, wherein the control unit is for a restraining arrangement.

13. The method as recited in claim 11, wherein the control unit is for a vehicle dynamics control system.

14. The method as recited in claim 11, wherein the control unit is for a kinematic sensor system.

* * * * *

UNITED STATES PATENT AND TRADEMARK OFFICE
CERTIFICATE OF CORRECTION

PATENT NO. : 8,483,849 B2
APPLICATION NO. : 10/566128
DATED : July 9, 2013
INVENTOR(S) : Recknagel et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1535 days.

Signed and Sealed this
Eighth Day of September, 2015

Michelle K. Lee
*Director of the United States Patent and Trademark Office*